(12) United States Patent  (10) Patent No.: US 8,724,838 B2
Jiang  (45) Date of Patent: May 13, 2014

(54) SPEAKER SYSTEM

(75) Inventor: Wen-Tao Jiang, Shenzhen (CN)

(73) Assignees: AAC Acoustic Technologies (Shenzhen) Co., Ltd., Shenzhen (CN); American Audio Components Inc., La Verne, CA (US)

( * ) Notice: Subject to any disclaimer, the term of this patent is extended or adjusted under 35 U.S.C. 154(b) by 297 days.

(21) Appl. No.: 13/189,959

(22) Filed: Jul. 25, 2011

(65) Prior Publication Data
US 2012/0070026 A1    Mar. 22, 2012

(30) Foreign Application Priority Data
Sep. 20, 2010 (CN) .......................... 2010 1 0287390

(51) Int. Cl.
H04R 1/02 (2006.01)

(52) U.S. Cl.
USPC ............ 381/351; 381/345; 181/198; 181/199

(58) Field of Classification Search
USPC ........ 381/345, 351; 361/679.1; 181/198–199, 181/144–145
See application file for complete search history.

(56) References Cited

U.S. PATENT DOCUMENTS 7,477,755 B2 * 1/2009 Saiki et al. .................... 381/349
8,023,682 B2 * 9/2011 Tsao et al. .................... 381/386

* cited by examiner

Primary Examiner — Davetta W Goins
Assistant Examiner — Oyesola C Ojo
(74) Attorney, Agent, or Firm — Anova Law Group, PLLC

(57) ABSTRACT

A speaker system includes a case having a receiving chamber; a variable mechanism received in the receiving chamber for dividing the receiving chamber into a first chamber and a second chamber and being capable of varying a volume of the first chamber; and a speaker unit is received in the first chamber and defining an acoustic port facing an exterior of the case. The separating wall alternatively inserts into one of the receiving member for placing the separating wall precisely at specific locations. Thus, it is easy to vary the volume of the first chamber for achieving an excellent acoustic capability of the speaker system.

7 Claims, 4 Drawing Sheets

SPEAKER SYSTEM

FIELD OF THE INVENTION

The present disclosure relates to the art of speaker systems and, particularly to a speaker system with an improved resonant chamber.

DESCRIPTION OF RELATED ART

Generally, an electronic device, such as a mobile phone, uses a speaker system as a sound generator.

Typically, a related speaker system includes a case having a receiving chamber, a separating wall received in the receiving chamber for dividing the receiving chamber into a first chamber and a second chamber, and a speaker unit attached to the case and received in the first chamber. The case and separating wall are manufactured by injection molding, thereby forming an integral unit.

Acoustic capability of the speaker system is determined based on a volume of the first chamber. In order to achieve an excellent acoustic capability, the separating wall should be placed at an appropriate location. However, in order to place the separating wall precisely at specific location, the locations of the separating wall should be adjusted repeatedly. Because the case is integral with the separating wall, only one way for adjusting the locations of the separating wall is to design different molds. But, the cost is accordingly increased.

Therefore, it is desirable to provide a speaker system which can overcome the above-mentioned problem.

DETAILED DESCRIPTION

Figure 1:
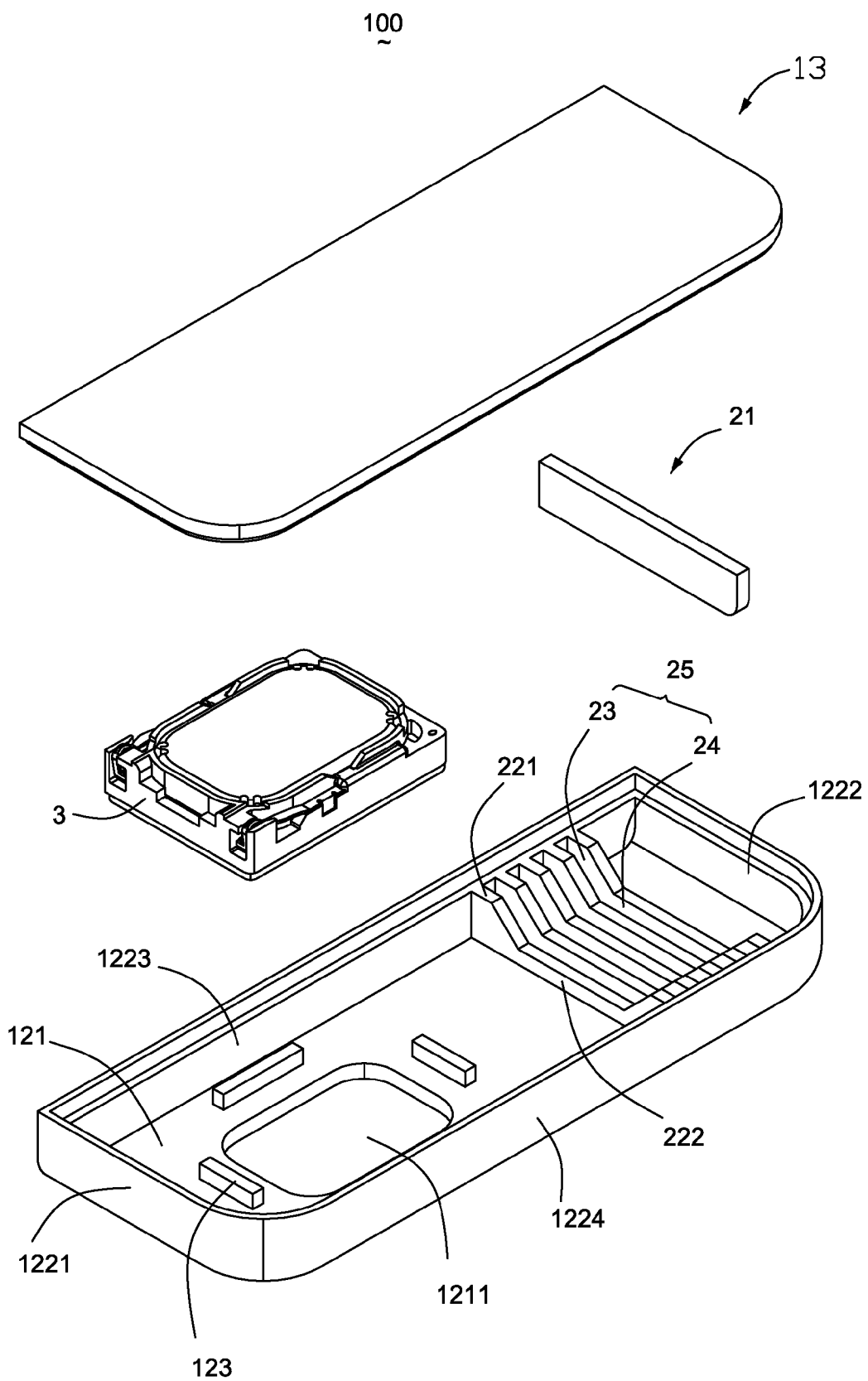
FIG. 1 is an illustrative exploded view of a speaker system in accordance with an exemplary embodiment of the present invention.
Figure 2:
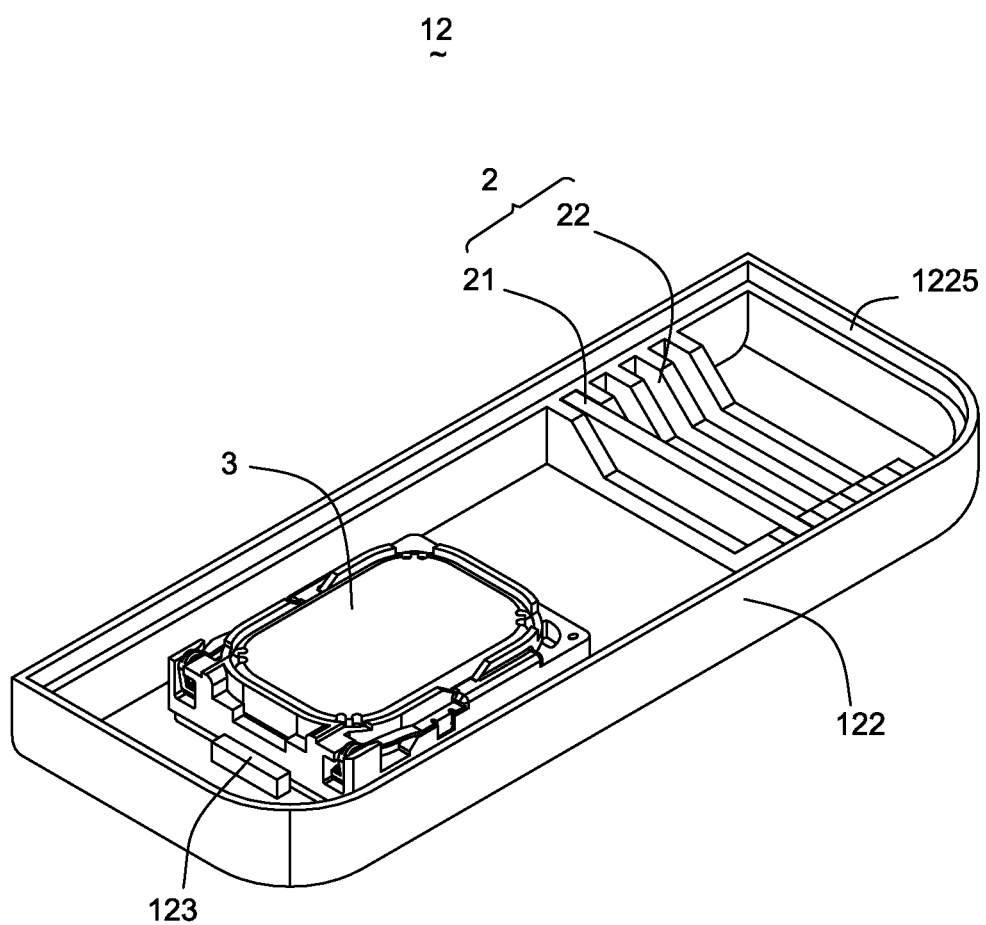
FIG. 2 is an illustrative assembled of the speaker system, a cover thereof being removed away.
Figure 3:
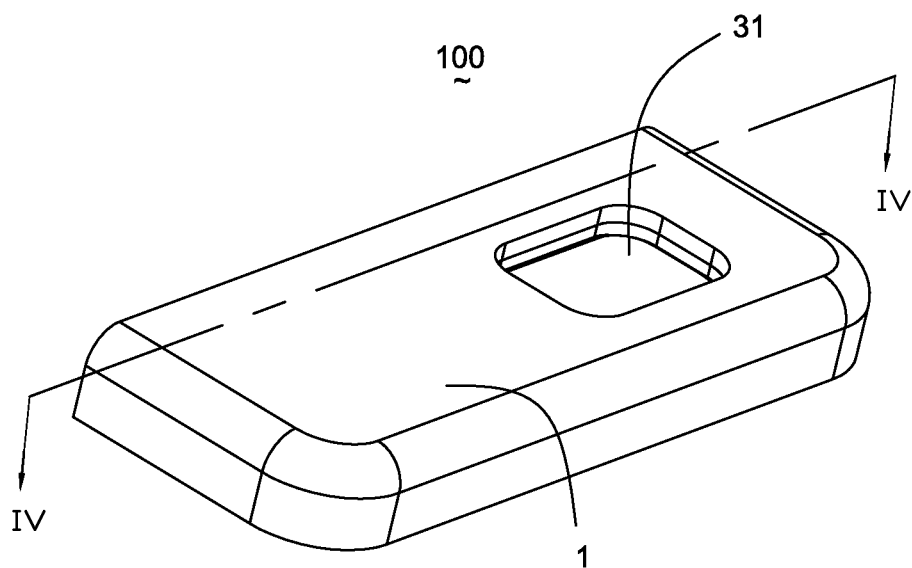
FIG. 3 is an illustrative assembled view of the speaker system.
Figure 4:
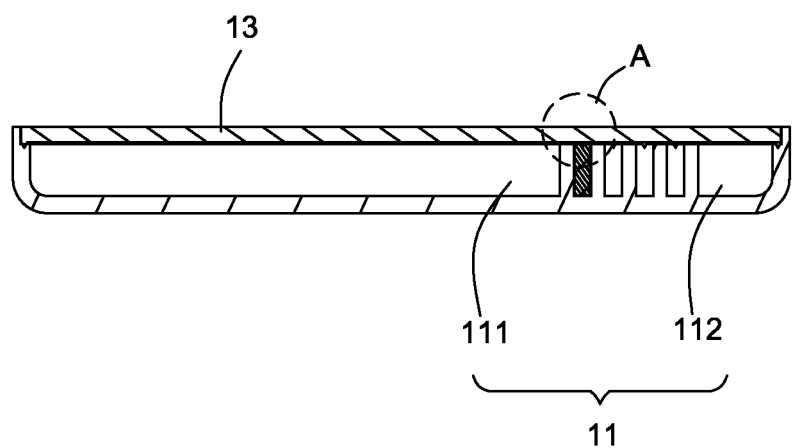
FIG. 4 is a cross-sectional view of the speaker system taken along line IV-IV in FIG. 3.
Figure 5:
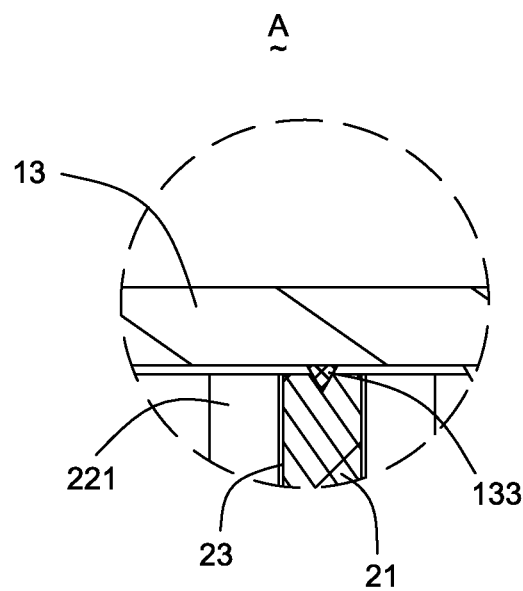
FIG. 5 is an enlarged view of Part A in FIG. 5.
Figure 6:
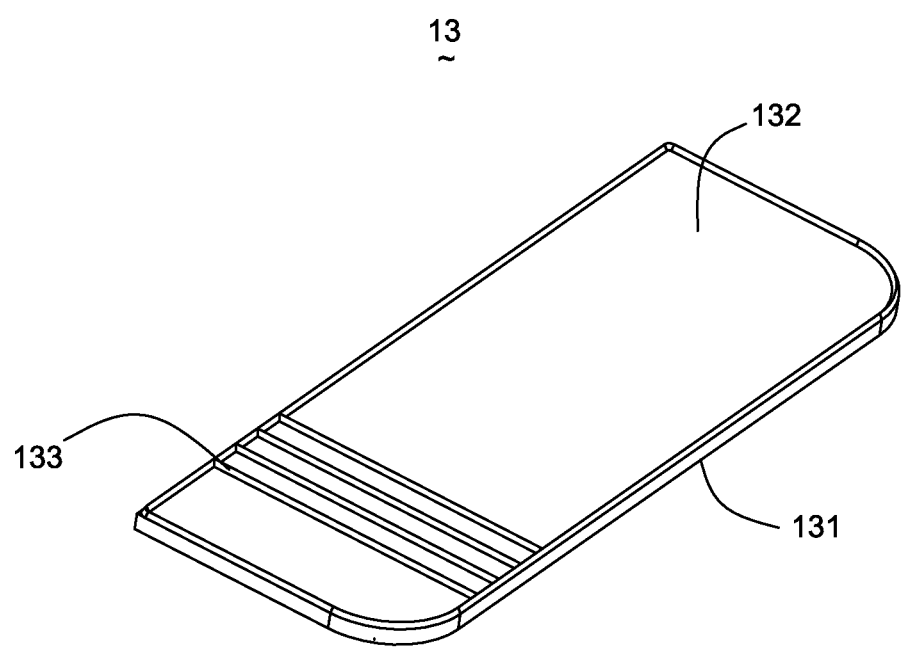
FIG. 6 is an isometric view of a cover of the speaker system.

Referring to FIGS. 1 to 6, a speaker system 100 in accordance with an exemplary embodiment of the present invention comprises a case 1 having a receiving chamber 11, a variable mechanism 2 received in the receiving chamber 11 for dividing the receiving chamber 11 into a first chamber 111 and a second chamber 112 and being capable of varying a volume of the first chamber 111, and a speaker unit 3 attached to the case 1 and received in the first chamber 111.

The speaker unit 3 defines an acoustic port 31 facing an exterior of the case 1.

The case 1 defines a housing 12 and a cover 13 mounted on the housing 12. The housing 12 and the cover 13 are welded and fixed by ultrasonic welding.

The housing 12 defines a base wall 121, a plurality of sidewalls 122, e.g. a first sidewall 1221, a second sidewall 1222, a third sidewall 1223, and a fourth sidewall 1224, approximately perpendicularly extending from an outer periphery of the base wall 121, and a plurality of fixing members 123 extending upwardly from the base wall 121 towards the cover 13 and unconnected with the cover 13 for engaging with an outer periphery of the speaker unit 3 for fixing the speaker unit 3 on the housing 12 firmly. The housing 12 further defines a sidestep 1225 extending from an upper end of the sidewalls 122 and away from the sidewalls 122 for receiving the cover 13.

The base wall 121 is approximately rectangular and defines an opening 1211 for receiving the speaker unit 3. The first, second, third and fourth sidewalls 1221, 1222, 1223, and 1224 protrude from and along the outer periphery of the base wall 121 in order. That is, the first and second sidewalls 1221 and 1222 are disposed opposite to each other, the third and fourth sidewalls 1223 and 1224 are disposed opposite to each other and both connect with the first and second sidewalls 1221 and 1222.

The variable member 2 is capable of varying the volume of the first chamber 111. The variable member 2 defines a supporting portion 22 and a separating wall 21 engaged with the supporting portion 22. The supporting portion 22 defines a pair of supporting walls 221 extending from a pair of opposite sidewalls towards each other and unconnected with each other, a connecting wall 222 extending from the base wall 121 of the housing 12 and connecting with the pair of supporting walls 221, at least two first grooves 23 extending from an upper surface of the supporting walls 221 towards the base wall 121 of the housing 12, at least two second grooves 24 extending from an upper surface of the connecting wall 222 towards the base wall 121 of the housing 12. The supporting walls 221 are connected with the base wall 121. The first grooves 23 are parallel to each other. The second grooves 24 are parallel to each other. Each first groove 23 is communicated with the corresponding second groove 24 for forming a receiving member 25 for receiving the separating wall 21. The receiving members 25 are parallel to each other. A part of the separating wall 21 is exposed out of the receiving members 25.

A height of the supporting portion is not higher than that of the sidewalls 122. In this exemplary embodiment of the present invention, the height of the connecting wall 222 is smaller than that of the supporting walls 221. A height of the supporting walls 221 of the housing 12 is equal to that of the sidewalls 122.

The separating wall 21 inserts into one of the receiving member 25 of the supporting portion 22 and cooperates with the supporting walls 21 for dividing the receiving chamber 11 into a first chamber 111 and a second chamber 112. The separating wall 21 can be, but is not limited to a planar.

The cover 13 defines a first surface 131, a second surface 132 opposite to the first surface 131 for engaging with the housing 12, and a plurality of welding ribs 133 extending from the second surface 132 and away from the first surface 131. The welding ribs 133 are cooperated with the separating wall 21 for sealing the first chamber 111. The welding ribs 133 are parallel to each other. The number of welding ribs is equal to that of the receiving member 25.

The separating wall alternatively inserts into one of the receiving member for placing the separating wall precisely at specific locations. Thus, it is easy to vary the volume of the first chamber for achieving an excellent acoustic capability.

It is understood that in an alternative exemplary embodiment, the height of the supporting walls is smaller than that of the connecting wall.

It is understood that in an alternative exemplary embodiment, the pair of supporting walls extending from a pair of adjacent sidewalls towards each other and unconnected with each other.

It is understood that in an alternative exemplary embodiment, the variable mechanism defines a supporting wall extending from one of the sidewalls towards the second chamber.

It will be understood that the above particular embodiment is shown and described by way of illustration only. The principles and the features of the present disclosure may be employed in various and numerous embodiments thereof without departing from the scope of the disclosure as claimed. The above-described embodiment illustrates the scope of the disclosure but do not restrict the scope of the disclosure.

What is claimed is:

1. A speaker system comprising:
   a case having a receiving chamber;
   a variable mechanism received in the receiving chamber for dividing the receiving chamber into a first chamber and a second chamber and being capable of varying a volume of the first chamber; and
   a speaker unit is received in the first chamber and defining an acoustic port facing an exterior of the case;
   wherein the variable mechanism defines at least two receiving members and a separating wall alternatively inserting into one of the receiving members for varying a volume of the first chamber, a part of the separating wall is exposed out of the receiving members.

2. The speaker system as claimed in claim 1, wherein the receiving members are parallel to each other.

3. The speaker system as claimed in claim 1, wherein the case defines a base wall and a plurality of sidewalls extending from the base wall.

4. The speaker system as claimed in claim 3, wherein the variable mechanism defines a supporting wall extending from one of the sidewalls towards the second chamber and the receiving members extending from an upper surface of the supporting walls towards the base wall of the housing, a height of the supporting wall is not higher than that of the sidewalls.

5. The speaker system as claimed in claim 4, wherein the variable mechanism defines a pair of supporting walls extending from a pair of adjacent sidewalls.

6. The speaker system as claimed in claim 4, wherein the variable mechanism defines a pair of supporting walls extending from a pair of opposite sidewalls.

7. The speaker system as claimed in claim 3, wherein the variable mechanism defines a connecting wall extending from the base wall, the receiving members are extending from an upper surface of the connecting wall towards the base wall of the housing, and a height of the connecting wall is not higher than that of the sidewalls.

* * * * *